United States Patent
Beigzadeh et al.

(10) Patent No.: US 10,457,777 B2
(45) Date of Patent: Oct. 29, 2019

(54) CARBAMYLATION COMPOSITIONS OF MONOVALENT METAL CONTAINING CATALYSTS, POLYOLS AND UREA COMPOUNDS AND CARBAMYLATION PROCESSES USING THE SAME

(71) Applicant: Dow Global Technologies LLC, Midland, MI (US)

(72) Inventors: Daryoosh Beigzadeh, Midland, MI (US); Thomas P. Clark, Midland, MI (US); Paul Foley, Traverse City, MI (US); Congcong Lu, Phoenixville, PA (US); Peter Margl, Midland, MI (US); Duane R. Romer, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 147 days.

(21) Appl. No.: 14/855,426

(22) Filed: Sep. 16, 2015

(65) Prior Publication Data
US 2016/0083517 A1    Mar. 24, 2016

Related U.S. Application Data

(60) Provisional application No. 62/053,363, filed on Sep. 22, 2014.

(51) Int. Cl.
*C08G 73/00*    (2006.01)
*C08G 71/04*    (2006.01)
*C08L 33/06*    (2006.01)

(52) U.S. Cl.
CPC ............. *C08G 73/00* (2013.01); *C08G 71/04* (2013.01); *C08L 33/066* (2013.01)

(58) Field of Classification Search
None
See application file for complete search history.

(56) References Cited

U.S. PATENT DOCUMENTS

| | | | |
|---|---|---|---|
| 3,464,938 A * | 9/1969 | Nordstrom | C08G 12/46 525/159 |
| 4,327,035 A * | 4/1982 | Heitz | C07C 68/065 528/370 |
| 4,410,697 A | 10/1983 | Torok et al. | |
| 4,611,079 A * | 9/1986 | Merger | C07C 271/06 560/21 |
| 5,356,669 A | 10/1994 | Rehfuss et al. | |
| 5,534,649 A * | 7/1996 | Cho | C07C 68/00 558/277 |
| 6,031,122 A * | 2/2000 | Mizukami | C07C 68/00 558/277 |
| 6,165,618 A | 12/2000 | Ohrbom et al. | |
| 6,331,596 B1 | 12/2001 | Ramesh et al. | |
| 6,927,271 B2 | 8/2005 | Grandhee | |
| 8,653,174 B2 | 2/2014 | Anderson et al. | |
| 2005/0203307 A1 * | 9/2005 | Ryu | C07C 68/00 558/277 |
| 2007/0252106 A1 | 11/2007 | Buchold et al. | |

FOREIGN PATENT DOCUMENTS

| | | |
|---|---|---|
| CA | 2433011 A1 | 9/2002 |
| EP | 0437258 A1 | 7/1991 |
| JP | H09255630 A | 9/1997 |
| JP | H10109960 A | 4/1998 |

OTHER PUBLICATIONS

ASTM D4274-11 Standard Test Methods for Testing Polyurethane Raw Materials: Determination of Hydroxyl Numbers of Polyols, 2011.
Harris "Fundamental and Applied Aspects of Urea and Thiourea Inclusion Compounds"; Supramol Chem; 2007; 19; pp. 47-53.
Steed, J.W. and Atwood, J.L. in "Supramolecular Chemistry"; John Wiley & Sons, pp. 393-398.
Woods "The ICI Poiyurethanes Book, 2nd Edition"; ICI Polyurethanes, Netherlands, 1990.
JP H09-255630, Partial Translation.
JP H10-109960, Partial Translation.

* cited by examiner

*Primary Examiner* — Rachel Kahn
(74) *Attorney, Agent, or Firm* — Karl E. Stauss; Cantor Colburn LLP

(57) ABSTRACT

The present invention provides carbamylation compositions of one or more urea compounds, one or more polyols and a monovalent transition metal or alkali metal catalyst (i), such as lithium ethylhexanoate, which compositions are substantially isocyanate free, enjoy reduced toxicity in comparison to tin catalysts, and which are useful in making polycarbamates which themselves provide compositions for making crosslinked polyurethanes.

11 Claims, No Drawings

CARBAMYLATION COMPOSITIONS OF MONOVALENT METAL CONTAINING CATALYSTS, POLYOLS AND UREA COMPOUNDS AND CARBAMYLATION PROCESSES USING THE SAME

The present invention relates to carbamylation compositions having reduced toxicity comprising one or more catalyst (i) which is a monovalent or alkali metal compound containing an anionic group, such as an organic group like an acetoacetoxy group, for example, lithium ethylhexanoate, one or more urea compounds and one or more polyols, as well as to methods of making and using the same and compositions comprising the polycarbamates made therefrom.

Recently, polyurethanes have been produced from polyols and alkyl carbamates or polycarbamates with co-reactive resins, such as aminoplast resins. Such polyurethanes are substantially isocyanate free. However, such polycarbamates also have proven difficult to make safely and efficiently.

One widely used catalyst for the reaction of polyols with amides or esters or carbamates are tin-containing catalysts, such as trialkyl tin compounds. However, such tin catalysts are now banned in some areas because of their toxicity. There remains a need for easy to handle, catalysts having reduced toxicity for the reaction of polyols to make carbamates.

U.S. Pat. No. 6,927,271 B2, to Grandhee, discloses compositions of hydroxyl and carbamate functional resins useful in making crosslinked polymers having good mechanical properties. The hydroxyl functional resins are made from polyisocyanates. The carbamate functional resins are made from alkyl carbamates. Accordingly, although the product composition is substantially isocyanate free, the materials used to make the composition have both isocyanates and alkyl carbamates.

The present inventors have endeavored to create reduced toxicity catalyst and raw material compositions for making carbamate functional resins useful to make crosslinked polyurethanes.

STATEMENT OF THE INVENTION

1. In accordance with the present invention, carbamylation compositions comprise from 0.1 to 5 wt. %, or, preferably, up to 1.0 wt. %, or, more preferably, from 0.25 to 0.75 wt. %, based on total composition solids, of one or more catalyst (i) which is a monovalent or alkali metal compound containing an anionic group, such as an organic group like an acetoacetoxy group or a carboxylate group, for example, lithium ethylhexanoate, one or more urea compounds and one or more polyols, wherein the ratio of moles of the urea compound to molar equivalents of hydroxyl groups in the one or more polyol (urea:OH) ranges from 0.3:1 to 2.5:1, preferably, from 0.5:1 to 1.5:1 or, more preferably, less than 1:1.

2. The carbamylation compositions as in 1, above, which are substantially free of isocyanate groups.

3. The carbamylation compositions as in 2, above, wherein the amount of isocyanate groups is less than 1 mol %, based on the total molar equivalents of hydroxyl groups plus total moles of isocyanate groups in the carbamylation compositions.

4. The carbamylation compositions as in any of 1, 2, or 3, above, wherein the catalyst (i) is chosen from alkali metal alkoxides, alkali metal alkanoates, alkali metal halides, alkali metal esters from alkanoic acids, alkali metal esters from sulfonic acids or halogenated sulfonic acids, copper (I) alkanoic acid metal esters, copper (I) sulfonic acid metal esters, copper (I) halogenated sulfonic acid metal esters, silver (I) alkanoic acid metal esters, silver (I) sulfonic acid metal esters, silver (I) halogenated sulfonic acid metal esters, and mixtures thereof, such as, for example, 2,2,6,6-tetramethyl-3,5-heptanedionato cesium, cesium carbonate, cesium trifluoroacetate, lithium 2-ethylhexanoate, and lithium acetylacetonate.

5. The carbamylation compositions as in any of 1, 2, 3, or 4, above, wherein the one or more urea compounds is urea, biuret, triuret, N-substituted $C_1$ to $C_6$ alkyl ureas, such as N-methyl urea or N-ethyl urea, and mixtures thereof.

6. The carbamylation compositions as in any of 1, 2, 3, 4, or 5 above, wherein the one or more polyols has three or more hydroxyl groups, such as, for example, one chosen from an acrylic polyol and an alkyd polyol.

7. In another aspect, the present invention provides methods of using the carbamylation compositions of any of 1, 2, 3, 4, 5, or 6, above, to make polycarbamates comprising slowly adding one or more urea compound, for example, as a solid or in a water or aqueous solution to a reaction vessel containing the one or more catalysts (i) and one or more polyol to form a reaction mixture and heating to a temperature of from 100 to 180° C., or, preferably, from 120 to 170° C., to form the polycarbamate.

8. The methods of 7, above, wherein the reaction vessel is maintained under vacuum or a bubbling nitrogen gas ($N_2$) blanket to remove ammonia and other volatiles.

In another aspect of the present invention, coating compositions comprise the polycarbamate of the present invention and, in a separate component, a dialdehyde or polyaldehyde, such as a cyclohexane dialdehyde.

As used herein, the term "alkyd" means a polyester made from reacting one or more polyalcohols and one or more polycarboxylic acids or their anhydrides, along with one or more monocarboxylic acids, such as long-chain fatty acids having up to 60 carbons, their corresponding triglycerides, and mixtures thereof. The term "oil-based alkyd resin" means a polyester which has been modified by addition of saturated or unsaturated fatty acids or their corresponding triglycerides; and the term "oil-free alkyd resin" means polyesters that have been modified by addition of saturated monocarboxylic acids. As used herein, the term "non-drying alkyd resins" means those alkyds made from non-drying monocarboxylic acid oils, such as coconut oil. Non-drying alkyds may be crosslinked through their hydroxyl functional groups to become part of the film-former. As used herein, terms referring to "oil lengths" of alkyd resins, e.g., short oil, medium oil or long oil alkyd refer to the proportion of the oil or fatty acid in the alkyd resin, by the weight percent of fatty acids or triglyceride in the alkyd, based on total solids. Alkyd resins are classified, as follows: "Very long" is over 70%, "long" is 56-70%, "medium" is 46-55% and "short" is below 45%. As used herein, the term "drying alkyd resins" means those alkyds made from polyunsaturated fatty acids or triglycerides (drying oils), such as linseed oil, that can dry by air oxidation, or autoxidative drying.

As used herein, the acronym "ANSI" stands for American National Standards Institute, the name of an organization headquartered in Washington, D.C., USA.

As used herein, the acronym "ASTM" stands for ASTM International, the name of an organization headquartered in West Conshohocken, Pa., USA; ASTM International was previously known as the American Society for Testing and Materials. As used herein, the term "aqueous" means water or a mixture of water and a polar solvent, such as methyl ethyl ketone, or an alcohol.

As used herein, the term "number of molar equivalents of hydroxyl groups" of any polyol in a carbamylation composition refers to the sum total of the mass of each polyol used divided by the hydroxyl equivalent weight (OHEW) of the polyol. Thus, the number of moles of hydroxyl groups of acrylic polyol in a carbamylation composition containing 10 g of each of an acrylic polyol having a hydroxyl number of 100 and an acrylic polyol having a hydroxyl number of 250 equals 10/(56100/100) plus 10/(56100/250) or 10/560 plus 10/224.4 or (0.178+0.446) or 0.624 moles OH.

As used herein, the term "hydroxyl equivalent weight" or OHEW of any given polyol equals 56,100 (g/mole KOH) divided by the hydroxyl number of that polyol in mg polyol/g KOH.

As used herein, the term "hydroxyl number" or "OH number" of any given polyol is expressed as number of milligrams of potassium hydroxide (KOH) per gram polyol (mg KOH/g polyol) and means the amount in milligrams of potassium hydroxide (KOH) per gram polyol (mg KOH/g polyol) determined by following the titration methods set forth in ASTM D4274-11 (Standard Test Methods for Testing Polyurethane Raw Materials: Determination of Hydroxyl Numbers of Polyols (2011) Test Method A) performed at room temperature using as reagents 4-(dimethylamino)pyridine catalyst in tetrahydrofuran (THF) and acetic anhydride in THF and as titrant with 1N KOH in methanol. The methods include first titrating for the acid groups with potassium hydroxide solution to obtain an acid number (mg KOH/g polyol), acetylating the hydroxyl groups with acetic anhydride in the presence of pyridine, and titrating with 1N KOH in methanol after acetylation. The hydroxyl number is the difference between two titrations, one titration with a blank for reference and one titration with the sample. A description of how to determine a hydroxyl number for a composition is well-known in the art, for example in Woods, G., The ICI Polyurethanes Book, $2^{nd}$ ed. (ICI Polyurethanes, Netherlands, 1990).

As used herein, the term "ambient temperature curable" means capable of reacting in a chemically transforming process at from 0° C. to less than 80° C.

As used herein, the term "curing" means subjecting to conditions effective for chemically transforming or chemically transforming under such conditions.

As used herein, the term "curing temperature" means a degree of heat or cold effective for chemically transforming the invention ambient temperature curable composition to the invention crosslinked polyurethane.

As used herein, the term Fourier Transform Infrared spectroscopy (FTIR) means infrared spectrometry simultaneously collecting and converting spectral data using Fourier transform differential equations in a wide spectral range to estimate reaction conversion. In the spectrometry, sample vials were uncapped and placed into a convection oven for 3 hrs. at 75° C. under nitrogen gas purge to remove any volatile byproduct. A portion of each vial was transferred to another vial and methyl ethyl ketone was added to achieve a final concentration of 30 mg/mL. Vials were capped and placed on a shaking bed overnight at room temperature to facilitate dissolution. Using a micropipette, 100 µL of each solution was deposited into a well on a Dow-proprietary high-throughput FTIR silicon wafer substrate, and the wafer was dried at 70° C. for 1 hr. under nitrogen gas flow to generate thin films for analysis. IR spectra were collected on a Nicolet™ 6700 FTIR spectrometer (Thermo Fisher Scientific, Waltham, Mass.), equipped with a custom Dow HTR Array Accessory in transmission mode under a nitrogen purge. The instrument was set up with a deuterated triglycine sulfate (DTGS) detector (KBr), using the following settings: 64 scans, Res.=2, Auto gain, Optical Vel.=0.6329, Aperture=100. Calibration models were prepared using the peak height ratio of 3550/3370 wavelengths.

As used herein, the term "multicomponent composition" means a composition comprising two or more components, each one having at least one ingredient.

As used herein, the term "polyaldehyde" means a molecule containing two or more aldehyde groups or their hydrates, acetals or hemiacetals, wherein the molecule is capable of performing as described herein and is capable of reacting with the polycarbamate during the invention curing step so as to form the invention crosslinked polyurethane. The aldehyde group can be written herein as —C(=O)H or —CHO. The term "polyaldehyde" is not used herein to mean a polymeric substance made by self-polymerizing an aldehyde monomer.

As used herein, the term "polycarbamate" means a molecule containing two or more carbamate groups ($H_2NC(=O)O—$), wherein the molecule is capable of reacting with a polyaldehyde during curing so as to form a polyurethane.

As used herein, the term "average number of carbamate groups" means the number average molecular weight of a given polycarbamate as determined by gel permeation chromatography against a polystyrene standard divided by the carbamate equivalent weight of the polycarbamate.

As used herein, the term "carbamate equivalent weight" (CEW) on solids is calculated using the following equation:

$$CEW = (OHEW_{polyol} + (43 \times \text{Carbamate Conversion})) \div \text{Carbamate Conversion},$$

wherein the term "Carbamate Conversion" is a ratio determined using the following equation:

$$\text{Carbamate Conversion} = (\text{OH \#}_{polyol} - \text{OH \#}_{polycarbamate}) \div \text{OH \#}_{polyol}$$

Note that a Carbamate Conversion can be expressed as a percentage when multiplied by 100%.

As used herein, the term "solvent/diluents" as used herein comprises all conventional non-polar and polar organic solvents and diluents such as, for example, an alkane (e.g., a ($C_6$-$C_{12}$)alkane), ether (e.g. a ($C_2$-$C_{12}$)dialkyl ether), aliphatic esters (e.g., a ($C_2$-$C_{12}$)carboxylic ester), aliphatic ketones (e.g., a ($C_3$-$C_{12}$)ketone), secondary or tertiary carboxamide (e.g., a secondary or tertiary ($C_3$-$C_{12}$)carboxamide), sulfoxide (e.g., a ($C_2$-$C_{12}$)sulfoxide), aliphatic hydrocarbons, aromatic hydrocarbons, mixtures thereof and mixtures thereof with white spirit.

As used herein, the term "ps" or "substantially isocyanate-free" isocyanate groups means having less than 5 mole percent (mol %) of —N=C=O groups (i.e., isocyanate groups) based on the total molar equivalents of hydroxyl groups plus total moles of isocyanate groups in the carbamylation compositions, preferably, less than 3 mol %, or, more preferably, less than 1 mol %, and, still more preferably, less than 0.1 mol %.

As used herein, the term "substantially formaldehyde free" is less than 500 ppm based on the weight of polyaldehyde solids.

As used herein, the term "total solids" or "solids" refers to resins, reactants and all non-volatile additives or ingredients, including catalysts; solids does not include water, ammonia or solvents. Solids include non-reactive plasticizers which remain in the cured coating or polyurethane of the present invention.

Unless otherwise stated, all units of pressure and temperature refer to standard pressure and room temperature.

Unless otherwise stated, all ranges are inclusive and combinable. For example a stated range of from 0.5 wt. % to 90 wt. %, or, preferably, at most 60 wt. %, and, more preferably, at most 50 wt. %, with preferable minimum amounts of at least 1 wt. %, or, more preferably, at least 2 wt. % will read on ranges of from 0.5 wt. % to 90 wt. %, from 0.5 to 60 wt. %, or, from 0.5 to 50 wt. %, or, from 1 to 90 wt. %, or, preferably, from 1 to 60 wt. %, or, preferably, from 2 to 60 wt. %, or, preferably, from 1 to 50 wt. %, or, more preferably, from 2 to 50 wt. %.

As used herein, the acronym "ISO" stands for International Organization for Standardization, the name of an organization headquartered in Geneva 20, Switzerland.

The present inventors have discovered that monovalent or alkali metal compounds catalyze the reaction between hydroxyl groups of polyols and urea to form polycarbamates with good efficiency. This reaction is an equilibrium reaction that generates as a byproduct ammonia which needs to be removed from the reaction medium to achieve a high conversion of urea to carbamate.

In accordance with the present invention, carbamylation compositions comprise one or more urea compounds, one or more polyols and one or more catalysts (i) chosen from compounds having the following formula $M_mZ_n$, wherein M is a monovalent metal, such as a monovalent transition metal or an alkali metal, and Z is an anionic group containing compound or a compound capable of forming a covalent bond with M, wherein n times the valence number of Z equals X and m equals Y and, further wherein, the absolute value of X equals the absolute value of Y.

Monovalent metals useful in the catalyst (i) of the present invention include, for example, lithium (Li), sodium (Na), potassium (K), rubidium (Rb), and cesium (Cs) or transition metals in the +1 oxidation state such as copper (Cu) or silver (Ag). Transition metals in the +1 oxidation state may be obtained by methods known to the ordinary skilled artisan, such as, for example, thermally, electrolytically or photochemically.

Anionic groups or compounds Z capable of forming a covalent bond with M may be any of, for example, alkoxides, alkanoates, halides, esters from alkanoic acid, sulfonates, halogenated sulfonates, and mixtures thereof and chelates thereof.

Exemplary lithium-containing catalysts include lithium trifluoromethanesulfonate, lithium (acetylacetonate), lithium (2-ethylhexanoate), and lithium acetate.

Exemplary sodium-containing catalysts include sodium acetylacetonate, sodiumisopropoxide, sodium methanesulfonate, sodiumtrifluoromethanesulfonate, sodiumbutoxide, and sodium (2-ethylhexanoate).

Exemplary potassium-containing catalysts include, for example, potassium methanesulfonate, potassium trifluoromethanesulfonate, potassium isopropoxide, potassium acetylacetonate, potassium 2,4-pentanedionate, and potassium 2-ethylhexanoate.

Exemplary rubidium-containing catalysts include rubidium trifluoromethanesulfonate, rubidium acetylacetonate, rubidium isopropoxide, rubidium 2-ethylhexanoate, rubidium oxide, rubidium chloride and rubidium bromide.

Exemplary cesium catalysts include cesium (acetylacetonate), cesium (2-ethylhexanoate), cesium oxide, cesiumisopropoxide, cesium chloride and cesiumbromide.

Exemplary copper catalysts include copper (I) acetate, copper (I) acetylacetonate, copper (I) 2-ethylhexanoate, copper (I) methanesulfonate, and copper (I) trifluoromethanesulfonate The one or more catalysts (i) may be used in a total amount of from 0.1 wt. % to 5 wt. %, or, preferably, from 0.1 wt. % to 1.0 wt. %, based on total solids of the composition.

Catalyst efficiency varies with each catalyst. In general, to insure higher conversion (pref. ≥80% conversion) of urea compounds to carbamate groups, the amount of catalyst (i) ranges 0.25 wt. % or more, based on total carbamylation composition solids.

In accordance with the methods of the present invention, the urea compound may be added in the form of any of a fluent solid, melted or liquid form. Preferably, the urea compound is added in liquid form. The liquid form of the urea compound (or "liquid urea") may be achieved in any acceptable manner. For example, the urea compound may be dissolved in a solvent such as water. Alternatively, the urea compound may be melted. In yet another alternative, the urea compound may be suspended in a clathrate. A urea clathrate may also be known as a urea inclusion compound and may have the structure as described in "Supramolecular Chemistry" John Wiley & Sons, Jonathan W. Steed, Jerry L. Atwood, pp. 393-398 and Harris, K. D. M., "Fundamental and Applied Aspects of Urea and Thiourea Inclusion Compounds", *Supramol. Chem.* 2007, 19, 47-53.

Preferably, the urea compound is dissolved in water.

Suitable urea compounds may be chosen from urea, thiourea, biuret, triuret, N-substituted $C_1$ to $C_6$ alkyl ureas, such as N-methyl urea or N-ethyl urea that have a low level of toxicity, and mixtures thereof.

Substituted ureas can be made by conventional methods as disclosed in U.S. Pat. No. 4,410,697A, to Sandor et al.

As a liquid, the urea compound may be obtained in any known manner, such as, for example, by dissolving it or dispersing it in one or more solvents selected from water and organic alcohols. A urea compound can be present as a 5 to 80 wt. % solution in water, preferably, from 30 to 50 wt. %.

The urea compound in fluid form may be a liquid urea, which may be melted or suspended in a clathrate, such as a paraffin or cycloparaffin and rendered fluid by heating.

The one or more polyols of the present invention is any hydroxyl group containing material having 2 or more hydroxyl groups, preferably, 3 or more hydroxyl groups. Suitable polyols may comprise primary hydroxyl groups. For example, the hydroxyl groups may be in the 1,2 and/or 1,3 configuration.

Preferably, the polyol of the present invention may be any polymeric polyols, such as, for example, acrylic polyols, styrene-acrylic polyols, styrene-butadiene polyols, saturated polyester polyols, polyalkylene polyols, urethane polyols, alkyd polyols, polyether polyols and polycarbonate polyols. For example, a suitable polyol may comprise an acrylic polyol formed by copolymerizing acrylic or vinyl monomers and a hydroxyl functional acrylate, such as hydroxyethyl acrylate or hydroxyethyl methacrylate.

Preferably, at least one of the one or more polyols of the present invention has a hydroxyl number of from 50 to 250 hydroxyl groups or, preferably, from 100 to 225.

As used herein, the term "polyester polyol" means any polyol that is an organic molecule having at least 2 alcohol (—OH) groups and at least one carboxylic ester ($CO_2$—C) functionality. Polyesters are made by bulk condensation of a polyol and a polyacid, as is known in the art. Alkyds are formed in the same manner as polyesters.

Suitable polyols include, for example, oligomers or polymers made by addition copolymerization of minor amounts of from 0.1 to 25 wt. % or, preferably, from 2 to 10 wt. %, based on total amounts of monomers used to make the polymer, of hydroxyl group-containing acrylic monomers with major amounts of at least one other vinyl monomer. Such suitable monomers may be, for example, hydroxyethyl acrylate, hydroxypropyl acrylate, hydroxybutyl acrylate, hydroxydodecyl acrylate, hydroxyethyl methacrylate, hydroxypropyl methacrylate, hydroxybutyl methacrylate, hydroxydodecyl methacrylate, hydroxybutyl vinyl ether, diethylene glycol vinyl ether and a combinations thereof. Suitable other monomers may be, for example, vinyl monomers such as styrene, vinyl ether, such as ethyl vinyl ether, butyl vinyl ether, cyclohexyl vinyl ether, esters of unsaturated carboxylic acids, such as methyl acrylate, methyl methacrylate, ethyl acrylate, butyl acrylate, ethyl methacrylate, 2-ethylhexyl acrylate, 2-ethylhexyl methacrylate, dodecyl acrylate, dodecyl methacrylate, dimethyl maleate and mixtures thereof.

For making alkyds, polyether polyols and polyester polyols, suitable polyol starting reactants may include, for example, ethylene glycol, diethylene glycol, neopentyl glycol, 1,4-butanediol, 1,6-hexanediol, glycerol, pentaerythritol, sorbitol and mannitol. Suitable glycols thus include, for example, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, dimethylolpropionic acid, and the like.

Polycarboxylic acids useful in making polyesters or alkyds may include, for example, phthalic anhydride or acid, maleic anhydride or acid, fumaric acid, isophthalic acid, succinic anhydride or acid, adipic acid, azelaic acid, and sebacic acid, terephthalic acid, tetrachlorophthalic anhydride, tetrahydrophthalic anhydride, dodecanedioic acid, sebacic acid, 1,4-cyclohexanedicarboxylic acid, 1,3-cyclohexanedicarboxylic acid, 2,6-naphthalenedicarboxylic acid, glutaric acid, trimellitic anhydride or acid, citric acid, pyromellitic dianhydride or acid, trimesic acid, sodium sulfoisophthalic acid, as well as their anhydrides, halides or salts. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Suitable monocarboxylic acid oils used to make an alkyd polyol may be chosen from oleic acid, lauric acid, coconut oil, sunflower oil, and mixtures thereof.

One suitable alkyd polyol is the reaction product of one or more monocarboxylic acid oils, one or more polycarboxylic acids having two or more carboxylic acid, salt or halide groups, or the anhydrides thereof, and one or more polyalcohols having three or more, preferably from three to five, hydroxyl groups, such as erythritol, pentaerythritol, trimethylolpropane, or trimethylolethane.

The carbamylation compositions of the present invention may comprise from 10 to 100 wt. % of one or more polyols, such as, for example, from 30 to 70 wt. %, based on the total solids in the carbamylation compositions.

In accordance with the carbamylation compositions of the present invention, the ratio of moles of the urea compound to molar equivalents of hydroxyl groups in the one or more polyols (urea:OH) ranges from 0.3:1 to 2.5:1, preferably, from 0.5:1 to 1.5:1 or, more preferably, less than 1:1 to avoid residual urea which may be undesirable from an appearance standpoint.

To form the carbamylation compositions and use them to make polycarbamates in accordance with the present invention, the addition of the urea compound to polyol may be accomplished in any known manner, such as in a batch or shot manner, or semi-continuous manner, as in gradual addition feeding.

Preferably, the urea compound is added to a mixture of catalyst (i) and polyol at a constant rate over a period of time in which the reaction proceeds.

In feeding the urea compound, it may be added to the one or more polyols at more than one rate, with the rate changing over the time period in which the reaction proceeds. For example, the urea may be added to the one or more polyols using a pulsed constant rate wherein the urea compound is added at a rate for a first period of time, followed by a second period of no urea compound addition, followed by urea compound addition at the same rate for a third period of time, and so on. Likewise, the urea compound may be added to the one or more polyols using a pulsed variable rate in which the urea compound is added at a first rate for a first period of time, followed by a second period of no urea compound addition, followed by urea compound addition at a second rate for a third period of time, and so on.

The urea compound may be added to the polyol in a gradient method, such as one in which urea is added to a solvent containing vessel at one feed rate and the contents of the solvent containing vessel are added to the reactor at a second, higher feed rate.

The one or more polyols may be used in bulk, i.e., in the absence of any solvent. Alternatively, the polyol is dissolved in a solvent prior to the adding the urea to the dissolved polyol. The solvent may be any solvent or mixture of solvents in which the polyol is soluble or partially soluble.

The solvent for the urea and the solvent for the polyol may form a heterogeneous azeotrope allowing removal of the solvent by decantation. Removal of the solvent from a heterogenous azeotrope permits concurrent removal of certain by-products, such as ammonia, which are soluble in either solvent. Where the first and second solvents form a heterogeneous azeotrope, allowing removal of the urea solvent enables return of the other solvent to the reactor.

Preferably, the methods of the present invention comprise azeotropically distilling the carbamylation composition during reaction. The azeotrope can be reused as a solvent or carrier depending on the carbamylation composition used. Preferably, the azeotrope can be used as a solvent for a reproduction of the carbamylation of the same urea compounds and polyols used in the carbamylation composition from which the azeotrope was generated. For example, the distillate may be phase separated in a continuous decanter and the xylene phase returned to the reactor.

The reaction to form carbamates may take anywhere from 2 to 50 hours to complete, preferably, 8 to 30 hours.

The methods can comprise carbamylating while azeotropically distilling the carbamylation composition and using a nitrogen or non-condensible gas sparge to facilitate removal of impurities.

Preferably, carbamylation is carried out under at least partial vacuum conditions, thereby creating an internal boiling or stripping action to remove ammonia without using a non-condensable gas. Solvent in the urea compound feed is azeotropically distilled with organic solvent in the carbamylation composition, e.g., o-xylene, thereby facilitating removal of ammonia in the condensed vapor leaving the reactor.

Azeotropically distilling the carbamylation composition could include a very slow gas sparge to facilitate the vacuum stripping action created by the boiling action. For example, an applied vacuum of 400-450 Torr and a very slow nitrogen gas sparging rate (0.3-0.5 sccm) produced a 75% reduction in the level of alkyl carbamate side product compared to the same reaction with nitrogen sparging only (no vacuum) at a higher rate (20 sccm).

More preferably, azeotropically distilling the carbamylation composition under vacuum conditions during carbamylation further comprises feeding a slow trickle of water after the urea addition is complete may facilitate more effective ammonia removal. Likewise, a counter-current water spray (contact condenser) may be employed to condense and adsorb ammonia from the distillate phase and to dissolve trace urea present in the reactor.

The process of the present invention may achieve at least a 50% conversion of hydroxyl groups of the polyol to carbamate groups. The hydroxyl conversion may range from 30% to nearly 100%, or, 50% or higher, or, preferably, 65% or higher, or, more preferably, 80% or higher.

The carbamylation compositions of the present invention may further include one or more additional catalysts selected from the group consisting of carbamylation catalysts. Such second carbamylation catalysts include, for example, dibutyltin oxide, dibutyltin acetate, tetravalent metal catalysts, such as Titanium (IV)-compounds and Zirconium (IV)-compounds, and divalent metal catalysts, such as Manganese(II) compounds and Zinc (II)-compounds.

The polycarbamates made by the methods of the present may be used, for example, in coating compositions, such as multicomponent compositions of one or more polycarbamate of the present invention and one or more polyaldehydes. Such compositions may form, for example, polyurethanes from crosslinking reaction of the polycarbamate and components with multiple aldehyde functionalities. Exemplary end uses for such coatings include metal, ceramic, wood and plastic coatings, including for example wind blade coatings and automotive coatings.

Suitable polyaldehydes for making the multicomponent compositions of the present invention may have two, three, four or more aldehyde groups, each of which may be blocked or unblocked. A polyaldehyde having three aldehyde groups is referred to herein as a "trialdehyde". The polyaldehyde can be any having from 2 to 100 carbons, with the proviso that polyaldehydes having more than 20 carbon atoms will have at least one aldehyde group for every 11 carbon atoms. The polyaldehyde of the present invention is substantially formaldehyde free.

Compositions comprising the polycarbamates of the present invention independently may further comprise one or more additional ingredients, such as, for example, one or more organic solvent, in the total amount of 0.1 wt. % to ≤90 wt. %, based on the total weight of solids in the compositions; one or more triggering agents, such as Lewis acids (e.g., boron trifluoride etherate) and protic acids having a $pK_a$ of 6 or lower, wherein $pK_a$ is negative base-10 logarithm of acid dissociation constant, $K_a$, of the protic acid (i.e., Brønsted acids); one or more curing inhibitors or polar protic additives, such as water or lower alkanols; one or more dehydrating agent, such as, for example, carboxylic anhydrides, carboxylic acid halides (e.g., acetyl chloride), and sulfonic acid halides (e.g., toluenesulfonyl chloride) in the total amount of 0.01 wt % to 10 wt. %, based on the total weight of solids in the composition; any one or more of a surfactant, a dispersing agent, a wetting agent, an adhesion promoter, an ultraviolet (UV) light absorber, a light stabilizer, one or more colorants, pigments, extenders or dyes, and antioxidants; and one or more drier salt or "siccative", e.g., of cobalt, manganese, lead, zirconium, calcium or zinc, in an alkyd polycarbamate composition.

Advantageously, the compositions of the present invention suitable in making coatings may have a solids content within the range of from 20 to 90% by volume, preferably 25 to 75% by volume.

The polycarbamate containing compositions of the present invention may have a pH of 7.0, or less, preferably, from pH 3 to pH<6.

Preferably, to reduce or eliminate the correlation between pot life of a composition and coating drying time or coating hardness, or both upon curing thereof, the multicomponent compositions of the present invention comprise a polar protic additive which acts as a curing inhibitor. The polar protic additive may include, for example, water or alkanols (e.g., $(C_1-C_{12})$alkanols) in the amount of 0.01 wt. % to ≤90 wt. %, all amounts based on the total weight of solids in the multicomponent compositions, such as from 0.5 wt. % to 90 wt. %, or, preferably, at most 60 wt. %, and, more preferably, at most 50 wt. %. Preferably, minimum amounts are at least 1 wt. %, based on the total weight of solids in the composition, and, still more preferably, at least 2 wt. %.

The compositions of the present invention may be used anywhere a crosslinked polyurethane is useful, such as, for example, coatings, sealants, adhesives, articles comprising cast parts (e.g., automobile bumpers), foams, and elastomeric fibers. Coating compositions may include, for example, decorative paints for interior and exterior use, flat house paints, clear or translucent wood finishes, such as floor coatings, and varnishes, automotive coatings, and baking enamels for appliances. Adhesives may include, for example, floor, furniture, automotive, industrial maintenance and certain adhesive applications requiring curing at ambient temperatures. The compositions of the present invention may be useful for preparing articles, such as foams.

The substrates suitable for being adhered to, coated, or sealed independently can comprise any material. Examples of suitable material are wood, lignocellulosic and woody substrates such as wood, plywood, laminates made from wood, bamboo and bamboo laminates, composite board; metals, such as bare metal or metal that has been pretreated or primed, for example to impart corrosion resistance; ceramic, plastic, gypsum board or sheetrock; and glass. Exemplary metal substrates may include, for example, steel, aluminum, copper, zinc, magnesium, and alloys thereof. The components of the compositions can be varied to suit the temperature tolerance of the substrate material.

EXAMPLES

The following examples illustrate the present invention but are not intended to limit the scope of the invention.

Carbamylation of an acrylic polyol having a hydroxyl number of 83 and urea were conducted in an array of 48 high throughput reactors (using glass tube inserts) having an internal volume of 35 ml and equipped with a stirrer and a continuous $N_2$ gas purge of the reactor head space to efficiently remove volatile by products, such as ammonia. Each reactor, included the catalysts indicated in Table 1, below. Trials were carried out in sets of 48 in triplicate, with each set containing four control experiments using dibutyltin oxide ($Bu_2SnO$) and two control experiments with no catalyst.

In each trial, the glass tubes were pre-weighed loaded with about 9 g of a 65% w/w solution of the acrylic polyol in xylene and were then weighed to determine the exact weight of polyol added. Urea and catalyst were then added based on the weight of the polyol in order to achieve a molar ratio (moles urea/molar equivalents OH) of 0.6 and 1 wt. % of catalyst, based on the weight of polyol, respectively. The tubes were then placed into the bottom part of the high throughput reactor and the reactor head was placed on top and clamped in order to seal the reactor. The reactor was then heated to 140° C. while being purged by $N_2$ gas. The results from multiple individual trials are shown in Table 1, below.

The final polycarbamate product was analyzed using Fourier transform infrared spectroscopy (FTIR) to monitor the disappearance of hydroxyl groups and thereby measure of the extent of each reaction. The control experiments conducted with $Bu_2SnO$ were used as reference for comparing the catalytic efficiency of the each catalyst (i) tested. The extent of reaction in each tube, as determined by FTIR, was divided by the average of the extent of reaction in the $Bu_2SnO$ in the same set.

The hydroxyl or hydroxyl group conversion from polyol to the final product was determined by monitoring the ratio of the IR spectral peak heights at 3550/3370 wavelengths in the composition. For each catalyst compound tested, the reported relative conversion in Table 1, below, was obtained by dividing the peak height ratios for each catalyst compound to the same ratios found using a control experimental catalyst (Bu2SnO).

TABLE 1

Urea and Acrylic Polyol Carbamylation Compositions

| Example | Chemical Name | Relative Conversion |
|---|---|---|
| 1A | 2,2,6,6-Tetramethyl-3,5-heptanedionato cesium | 0.80 |
| 1B | 2,2,6,6-Tetramethyl-3,5-heptanedionato cesium | 0.73 |
| 1C | 2,2,6,6-Tetramethyl-3,5-heptanedionato cesium | 0.73 |
| 2A | Cesium carbonate | 0.78 |
| 2B | Cesium carbonate | 0.75 |
| 2C | Cesium carbonate | 0.75 |
| 3A | Cesium trifluoroacetate | 0.82 |
| 3B | Cesium trifluoroacetate | 0.77 |
| 3C | Cesium trifluoroacetate | 0.76 |
| 4A | Lithium acetylacetonate | 0.73 |
| 4B | Lithium acetylacetonate | 0.67 |
| 4C | Lithium acetylacetonate | 0.62 |
| 5A | Lithium 2-ethylhexanoate | 1.13 |
| 5B | Lithium 2-ethylhexanoate | 1.05 |
| 5C | Lithium 2-ethylhexanoate | 0.95 |
| 6A | Copper(I) trifluoromethanesulfonate complex (2:1) | 0.92 |
| 6B | Copper(I) trifluoromethanesulfonate complex (2:1) | 0.96 |
| 6C | Copper(I) trifluoromethanesulfonate complex (2:1) | 0.96 |
| C1A | stannous 2-ethylhexanoate | 1.13 |
| C1B | stannous 2-ethylhexanoate | 1.10 |
| C1C | stannous 2-ethylhexanoate | 0.95 |
| C2A | No catalyst | 0.75 |
| C2B | No catalyst | 0.74 |
| C2C | No catalyst | 0.72 |
| C2D | No catalyst | 0.70 |
| C2E | No catalyst | 0.67 |
| C2F | No catalyst | 0.67 |
| C2G | No catalyst | 0.67 |
| C2H | No catalyst | 0.66 |
| C2I | No catalyst | 0.65 |
| C2J | No catalyst | 0.64 |
| C2K | No catalyst | 0.63 |
| C2L | No catalyst | 0.61 |
| C2M | No catalyst | 0.59 |
| C2N | No catalyst | 0.54 |
| C3A | Bu2SnO | 1.12 |
| C3B | Bu2SnO | 1.08 |
| C3C | Bu2SnO | 1.06 |
| C3D | Bu2SnO | 1.06 |
| C3E | Bu2SnO | 1.05 |
| C3F | Bu2SnO | 1.05 |
| C3G | Bu2SnO | 1.04 |
| C3H | Bu2SnO | 1.04 |
| C3I | Bu2SnO | 1.04 |
| C3J | Bu2SnO | 1.04 |
| C3K | Bu2SnO | 1.03 |
| C3L | Bu2SnO | 1.02 |
| C3M | Bu2SnO | 1.01 |
| C3N | Bu2SnO | 1.01 |
| C3N | Bu2SnO | 0.99 |
| C3O | Bu2SnO | 0.99 |
| C3P | Bu2SnO | 0.98 |
| C3Q | Bu2SnO | 0.97 |
| C3R | Bu2SnO | 0.97 |
| C3S | Bu2SnO | 0.97 |
| C3T | Bu2SnO | 0.97 |
| C3U | Bu2SnO | 0.96 |
| C3V | Bu2SnO | 0.96 |
| C3W | Bu2SnO | 0.95 |
| C3X | Bu2SnO | 0.94 |
| C3Y | Bu2SnO | 0.94 |
| C3Z | Bu2SnO | 0.93 |
| C3AA | Bu2SnO | 0.91 |

The relative performance of tested compounds in the reaction between acrylic polyol and urea is tabulated in Table 1, above. As shown in the table and allowing for deviations between the various trials, the catalyst (i) of the present invention, especially lithium ethylhexanoate, effectively catalyzed carbamylation of the polyols in the carbamylation composition. In the case of lithium ethylhexanoate and copper(I) trifluoromethanesulfonate complex (2:1), the inventive catalysts (i) performed about as well as the comparative tin containing catalyst.

We claim:

1. A carbamylation composition comprising from 0.1 to 1 wt. %, based on total solids, of one or more catalyst (i) which is a monovalent or alkali metal compound containing an anionic group, one or more urea compounds and one or more polymeric polyols, wherein the ratio of moles of the urea compound to molar equivalents of hydroxyl groups in the one or more polyol (urea:OH) ranges from 0.3:1 to 2.5:1 wherein the catalyst (i) is chosen from alkali metal acetylacetonates, 2,2,6,6-tetramethyl-3,5-heptanedionato cesium, alkali metal esters from alkanoic acids, alkali metal esters from sulfonic acids, alkali metal esters from halogenated sulfonic acids, copper (I) sulfonic metal esters, copper (I) halogenated sulfonic acid metal esters, silver (I) sulfonic acid metal esters, silver (I) halogenated sulfonic acid metal esters, cesium trifluoroacetate, and mixtures thereof.

2. The carbamylation composition as claimed in claim 1, comprising from 0.25 to 0.75 wt. %, based on total solids, of the one or more catalyst (i).

3. The carbamylation composition as claimed in claim 1, wherein the ratio of moles of the urea compound to molar equivalents of hydroxyl groups in the one or more polyols ranges less than 1:1.

4. The carbamylation composition as claimed in claim 1 which are substantially free of isocyanate groups.

5. The carbamylation composition as claimed in claim 4, wherein the amount of isocyanate groups is less than 1 mol %, based on the total molar equivalents of hydroxyl groups plus total moles of isocyanate groups in the carbamylation compositions.

6. The carbamylation composition as claimed in claim 1, wherein the one or more catalyst (i) comprises lithium 2-ethylhexanoate, lithium acetylacetonate, 2,2,6,6-tetramethyl-3,5-heptanedionato cesium, or copper (I) trifluoromethanesulfonate complex (2:1).

7. The carbamylation composition as claimed in claim 1, wherein the one or more urea compounds is urea, biuret, triuret, N-substituted $C_1$ to $C_6$ alkyl ureas, such as N-methyl urea or N-ethyl urea, and mixtures thereof.

8. The carbamylation composition as claimed in claim 1, wherein the one or more polyols is chosen from an acrylic polyol and an alkyd polyol.

9. A method of using the carbamylation composition as claimed in claim 1 to make polycarbamates, comprising slowly adding the one or more urea compounds in water to a reaction vessel containing the one or more catalysts (i) and the one or more polymeric polyols to form a reaction mixture and heating to a temperature of from 100 to 180° C. to form the polycarbamate.

10. The carbamylation composition as claimed in claim 1, wherein the one or more catalyst (i) comprises lithium acetylacetonate, 2,2,6,6-tetramethyl-3,5-heptanedionato cesium, or copper (I) trifluoromethanesulfonate complex (2:1).

11. The carbamylation composition as claimed in claim 1, wherein the polymeric polyol has a hydroxyl number of 50 to 250 mg KOH/g polyol, as determined by ASTM D4274-11, Test Method A.

\* \* \* \* \*